(12) United States Patent
Laimboeck

(10) Patent No.: US 8,839,749 B2
(45) Date of Patent: Sep. 23, 2014

(54) PISTON HAVING A HOLLOW COOLING SPACE DEFINED IN A MANTLE WALL

(75) Inventor: Franz Laimboeck, Goleta, CA (US)

(73) Assignee: Mahle Koenig Kommanditgesellschaft GmbH & Co. KG, Rankweil (AT)

( * ) Notice: Subject to any disclaimer, the term of this patent is extended or adjusted under 35 U.S.C. 154(b) by 17 days.

(21) Appl. No.: 13/490,660

(22) Filed: Jun. 7, 2012

(65) Prior Publication Data

US 2012/0312271 A1 Dec. 13, 2012

Related U.S. Application Data

(60) Provisional application No. 61/494,037, filed on Jun. 7, 2011.

(51) Int. Cl.
*F02F 3/22* (2006.01)
*F16J 1/09* (2006.01)

(52) U.S. Cl.
USPC ...... 123/41.35; 123/193.6; 92/174; 92/181 R; 92/186

(58) Field of Classification Search
USPC .......... 123/41.34, 41.35, 41.39, 193.1, 193.6; 92/174, 181 R, 186
See application file for complete search history.

(56) References Cited

U.S. PATENT DOCUMENTS

| | | | | |
|---|---|---|---|---|
| 2,449,657 | A * | 9/1948 | Kishline | 92/157 |
| 4,506,632 | A * | 3/1985 | Kanda et al. | 123/41.35 |
| 4,744,359 | A | 5/1988 | Hatta et al. | |
| 5,363,822 | A * | 11/1994 | Tuohy | 123/193.6 |
| 5,413,074 | A * | 5/1995 | Horiuchi | 123/197.2 |
| 5,794,582 | A * | 8/1998 | Horiuchi | 123/197.2 |
| 7,134,383 | B2 * | 11/2006 | Petersen et al. | 92/186 |
| 7,624,574 | B2 * | 12/2009 | Sawada et al. | 60/516 |
| 7,836,815 | B2 * | 11/2010 | Doers et al. | 92/159 |
| 7,895,936 | B2 * | 3/2011 | Hofbauer | 92/186 |

FOREIGN PATENT DOCUMENTS

| | | |
|---|---|---|
| DE | 2613059 A1 | 6/1977 |
| JP | 61076146 A | 4/1986 |
| JP | 06093927 A * | 4/1994 ............... F02F 3/00 |

* cited by examiner

*Primary Examiner* — Noah Kamen
*Assistant Examiner* — Grant Moubry
(74) *Attorney, Agent, or Firm* — Laurence A. Greenberg; Werner H. Stemer; Ralph E. Locher

(57) ABSTRACT

A piston has a piston head, a piston pin support projecting from the piston head, and a mantle wall connected to the piston head. The mantle wall is formed with two tubular pieces that are disposed concentrically relative to one another and which are connected at a periphery of the piston head. A hollow space is formed between the tubular pieces.

27 Claims, 8 Drawing Sheets

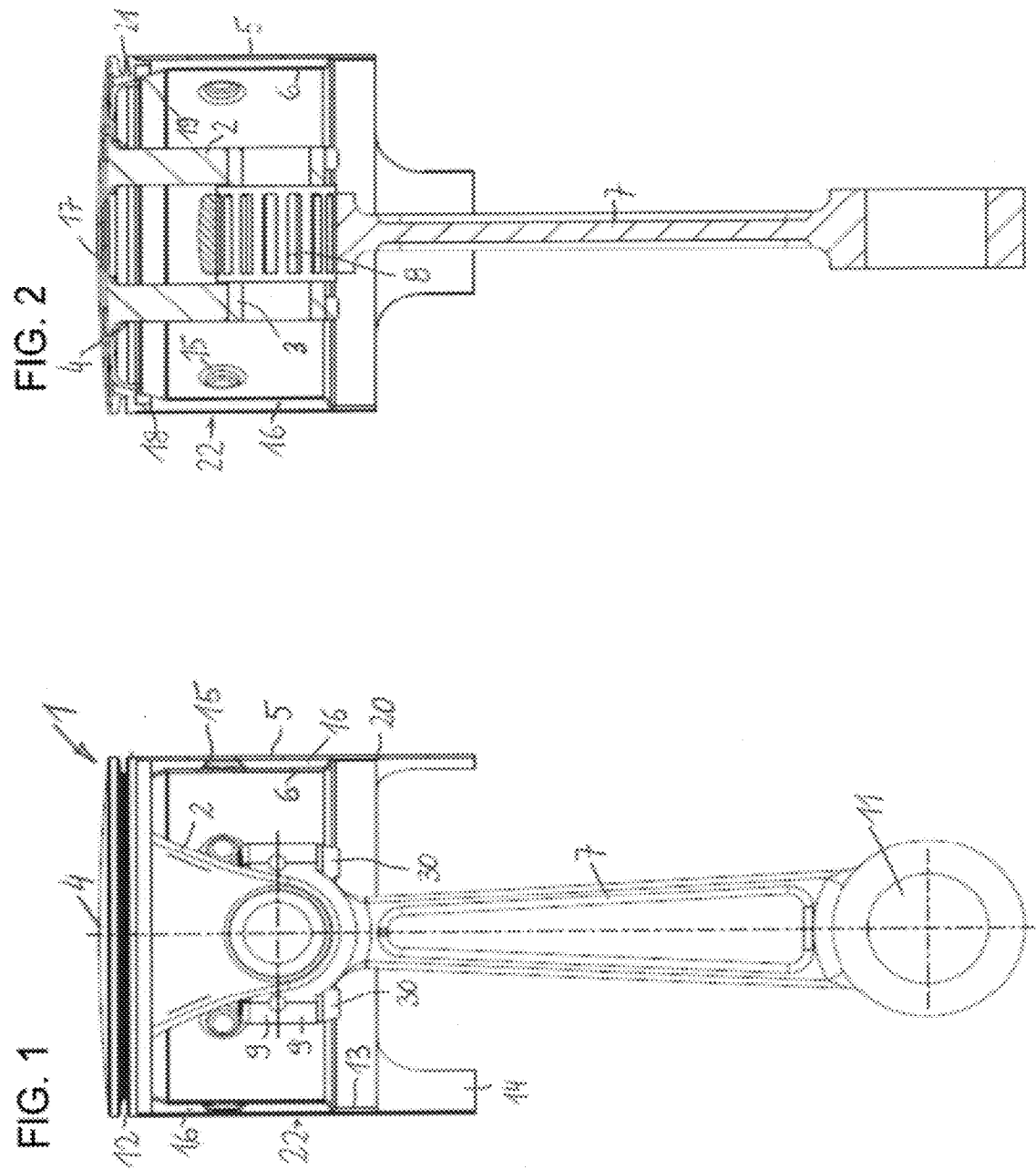

PISTON HAVING A HOLLOW COOLING SPACE DEFINED IN A MANTLE WALL

CROSS-REFERENCE TO RELATED APPLICATION

This application claims the benefit, under 35 U.S.C. §119 (e), of provisional patent application No. 61/494,037, filed Jun. 7, 2011; the prior application is herewith incorporated by reference in its entirety.

BACKGROUND OF THE INVENTION

Field of the Invention

The invention relates to a piston having a piston head, a piston pin support branching off therefrom and a mantle wall connected to the piston head. The mantle wall has two tubular pieces arranged concentrically relative to one another and which in the peripheral region of the piston head are in each case connected thereto.

SUMMARY OF THE INVENTION

The object of the invention is to ensure high thermal stability of such pistons. Moreover, the durability is intended to be as high as possible. Such pistons are intended to have a low weight and to be able to be produced easily from a few components.

With the foregoing and other objects in view there is provided, in accordance with the invention, a piston, comprising:
  a piston head;
  a piston pin support projecting from said piston head; and
  a mantle wall connected to said piston head, said mantle wall including two tubular pieces arranged concentrically relative to one another and connected to said piston head at a periphery of said piston head, and wherein said tubular pieces are disposed with a hollow space formed between said tubular pieces.

According to the invention, therefore, the above objects are achieved in a piston of the type mentioned above and, further, having the feature that a hollow space is formed between the tubular pieces defining the piston mantle.

By means of the tubular pieces arranged concentrically in the peripheral region of the piston head and fastened thereto, a piston of stable construction is produced with a mantle wall which is robust against deformation, and which during operation has the required stability. Moreover, the piston is able to be produced from components which are simple to manufacture, in particular tubular pieces and/or integral piston head-piston pin support components which may be produced in a casting method, so that a piston may be rapidly manufactured, at low costs.

For the strength of the piston it is advantageous if the external tubular mantle bears against an outwardly oriented projection of the piston head and/or the internal tubular piece bears against an inwardly oriented projection of the piston head or protrudes on to the piston head. Thus it is also possible to produce a welded connection between the tubular pieces and the piston head in a simple manner.

It assists a stable connection of the two tubular or otherwise thermally connected pieces when the peripheral end edge of the internal tubular piece remote from the piston head is welded to the external tubular piece. Such welded connections are able to be produced rapidly and in a durable manner. By the arrangement of concentric tubular pieces, the mantle wall features an exceptionally high degree of stiffness.

In order to improve the connection of the two tubular pieces and to increase the strength properties of the mantle wall, it is provided that outwardly protruding bulged portions are formed in the internal tubular piece, via which the two tubular pieces may be connected together, preferably by spot welding.

These measures do not in any way counter the advantage that between the tubular pieces a hollow space may be formed in which coolant is arranged. In addition to high strength, therefore, the piston according to the invention also has the option of providing coolant inside the mantle wall.

It is further provided that a cover plate is positioned on the surface of the piston head in the vicinity of the combustion chamber, said cover plate being spaced apart from said surface and forming a hollow chamber with said surface. The hollow space and the hollow chamber are connected via channels extending through the periphery of the piston head and advantageously coolant is contained in the hollow space and/or the hollow chamber, said coolant being liquid at the operating temperature of the piston and solid at room temperature. Approximately one third of the volume present is filled with coolant. Thus, in addition to a high degree of stability of the piston and/or the mantle wall and the piston head, excellent cooling possibilities are also available for the operation of the piston.

It is advantageous if the two tubular pieces are arranged concentrically, forming a hollow space extending at least over partial regions of the height of the mantle wall or the internal tubular piece. Expediently, the hollow space extends over the entire height of the internal tubular piece, except when it is provided that the end region of the internal tubular piece remote from the piston head is widened and bears with the widened region against the inner surface of the external tubular piece. A connection to the external tubular piece may preferably take place by roll welding. This drawn-in and/or reduced periphery of the end region increases the stability of the mantle wall by corresponding support of the external tubular piece.

It is structurally advantageous if the channels discharge in the region of the piston head which is located between the two concentrically arranged tubular pieces. In order to provide the required space, it is expedient if the internal tubular piece comprises an inwardly inclined and/or peripherally reduced end region in the discharge region of the channels.

It is advantageous in terms of strength for forming the hollow chamber if inside the hollow chamber spacers for supporting the cover plate protrude from the surface of the piston head, wherein the cover plate is optionally connected to said spacers by spot welding.

For a stable and rapid production of the piston, the cover plate and/or the tubular pieces may be welded to the piston head and/or connected thereto by forming an interference fit and/or by means of flanging. Thus the piston is provided with the strength properties required for extensive operation.

In order to keep the frictional losses of the piston as low as possible during operation and to provide enhanced heat transfer from piston mantle to the cylinder and to provide better sealing between piston mantle, mantle and cylinder, at least the external tubular piece, preferably the two tubular pieces, may form a continuous mantle wall without recesses, which is configured to be closed and continuous even in the region of the piston pin. It may also be provided that the regions of the mantle wall which are in the vicinity of, or oppose, the end regions of the piston pin, comprise recesses, which recesses are closed by closure parts which optionally extend the outer surface of the mantle wall and/or follow the surface path of the external tubular piece.

The greatest stability and the best strength properties are achieved when the piston head and the piston pin support are formed from a cast material, preferably ductile cast iron, and/or when the tubular pieces are formed by steel or aluminum or optionally fiber-reinforced light metal alloys, and/or when the cover plate is produced from a steel plate which is advantageously curved in a convex manner toward the combustion chamber. A coating of the cover plate which promotes combustion and/or limits corrosion and/or is insulating is possible. The cover plate may also be formed as a whole from material which promotes combustion and/or limits corrosion and/or is insulating. The piston may also be forged or produced from an aluminum cast part.

Simple production is achieved when the piston head and the piston pin support are configured as a one-piece cast part. The piston pin may be welded into the piston pin support. The piston pin is expediently manufactured from a steel tube.

A connecting rod may be pivotally mounted by a bearing on the piston pin. In this case, it is advantageous if the bearing enclosing the piston pin and the eye of the piston pin are configured to be able to be separated and/or with parts which may be joined together. The piston pin support may also be formed from multiple parts which may be joined together.

For the use of the piston according to the invention in a two-stroke engine, it is advantageous if the mantle wall surface of the piston, preferably the external tubular piece, forms two extensions or projections extending in each case over a predetermined peripheral region and opposing one another. Thus the corresponding openings in the cylinder may be covered in the required manner or left exposed. Specifically in this case, it is advantageous if the internal tubular piece reaches as far as the end region of the mantle wall and/or of the external tubular piece located between the extensions.

At least one groove may be formed along the periphery of the piston head for receiving a piston ring.

In accordance with an added feature of the invention, the piston head is formed with a depression. The depression may be in the form of a cylindrical shaped recess formed centrally in said piston head, or in the combustion chamber-facing cover plate.

In accordance with a concomitant feature of the invention, the hollow space between the interior and exterior mantle walls and/or the hollow chamber between the piston head and the cover plate is/are filled up to 25 to 50% of a volume thereof with coolant. In a preferred embodiment, they are filed 30 to 40% of the their volume.

Other features which are considered as characteristic for the invention are set forth in the appended claims.

Although the invention is illustrated and described herein as embodied in a piston, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows a piston with the connecting rod according to the invention schematically in section.

FIG. 2 shows a piston according to the invention in a section rotated by 90° to the view according to FIG. 1.

DETAILED DESCRIPTION OF THE INVENTION

Figure 1A:
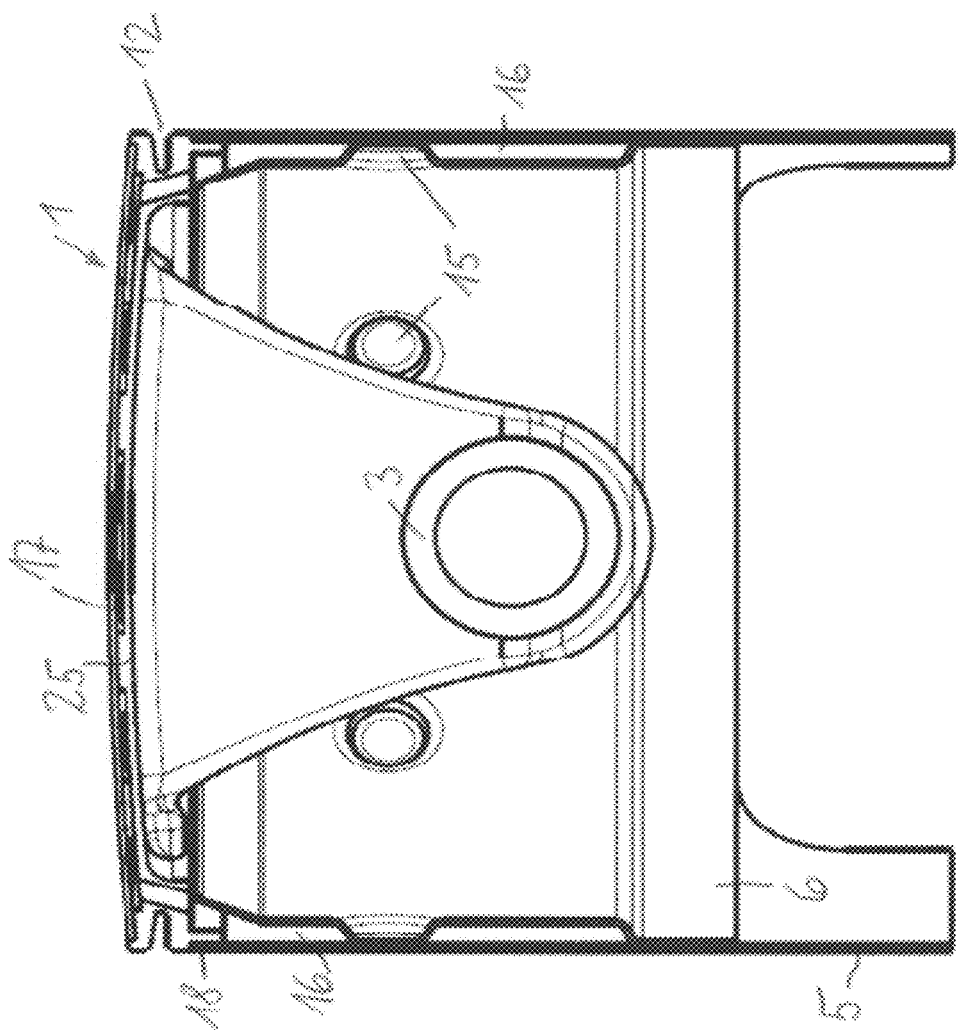
FIG. 1a shows an enlarged view of said piston.

Referring now to the figures of the drawing in detail and first, particularly, to FIG. 1 thereof, there is shown a schematic section through a piston according to the invention. The piston is provided with a connecting rod 7 which has a recess 11 for the crankpin. The piston comprises a piston head 1 which is covered by a cover plate 4 on the combustion chamber side. At least one peripheral groove 12 is formed in the piston head 1 for receiving a piston ring. An external tubular piece 5 and also an internal tubular piece 6 are fastened and/or attached to the piston head 1 by welding and/or by forming an interference fit and/or by forming flanged edges. The two tubular pieces 5, 6 are located substantially concentrically relative to each other. Slight deviations from a concentric arrangement may be undertaken for reasons of stability and strength. An eccentric arrangement, by for example 0.5 mm, of the internal tubular piece is certainly possible. Conventionally, circular tubular pieces or tubular pieces of elliptical shape having a slight eccentricity, are used. The external tubular piece 5 forms the external surface of the mantle wall 22 produced by the two tubular pieces 5 and 6. Between the internal tubular piece 6 which forms the internal wall of the mantle wall 22 and the external tubular piece 5 an annular hollow space 16 is formed, as said two tubes are arranged concentrically relative to one another with a predetermined spacing. In the internal tubular piece 6, bulged portions 15 may be formed which bear against the inner wall surface of the external tubular piece 5 and may be connected to the external tubular piece 5 by welds, in particular spot welds or resistance press welding.

The end region of the internal tubular piece 6 remote from the combustion chamber has a widened wall region 13 which bears against the inner surface of the external tubular piece 5. Along the end edge 20 of the internal tubular piece 6 remote from the combustion chamber, the internal tubular piece 6 may be welded to the external tubular piece 5.

The external tubular piece 5 has extensions 14 in the end region remote from the combustion chamber, said extensions optionally being able to be produced on the internal tubular piece 6 in the same shape and position. Said extensions 14 serve for closing and/or for opening up channels and openings in the wall of the cylinder in which the piston runs.

A piston pin support 2 is integrally formed on the piston head 1. Advantageously, the piston head 1 and the piston pin support 2 are produced in one piece. A piston pin 3 is inserted, optionally welded, into the piston pin support 2. The connecting rod 7 has a bearing 8 which encloses the piston pin 3. Said bearing 8 is able to be separated so that it may be placed around the welded piston pin 3 and/or positioned thereon. Moreover, the parts 9, 9' of the connecting rod 7 comprising the bearing 8 are designed to be able to be separated, wherein the two parts 9 and 9' may be connected together by means of screws 30.

FIG. 1*a* shows an enlarged central section through the piston according to FIG. 1, in which the details may be identified more clearly.

FIG. 2 shows the piston according to the invention according to FIG. 1 in a vertical section relative to the section according to FIG. 1. The bearing 8 which surrounds the piston pin 3 is visible. The cover plate 4 is located at a distance from the surface 24 of the piston head 1 in the vicinity of the combustion chamber, so that in the intermediate space between the cover plate 4 and the surface 24 a hollow space 17 is produced. Said hollow space 17 communicates via channels 21 which extend through the piston head 1, with the hollow space 16 between the external tubular piece 5 and the internal tubular piece 6. It is provided that the hollow space 16 and the hollow chamber 17 are connected via channels 21 extending through the periphery of the piston head 1 and a coolant is contained in the hollow space 16 and the hollow chamber 17, said coolant being liquid at the operating temperature of the piston and solid at room temperature. A plurality of channels, for example 20 channels, may be formed along the periphery of the piston head 1. During operation, depending on the piston movement, the coolant is moved in a reciprocating manner between the hollow space 16 and the hollow chamber 17.

Figure 3:
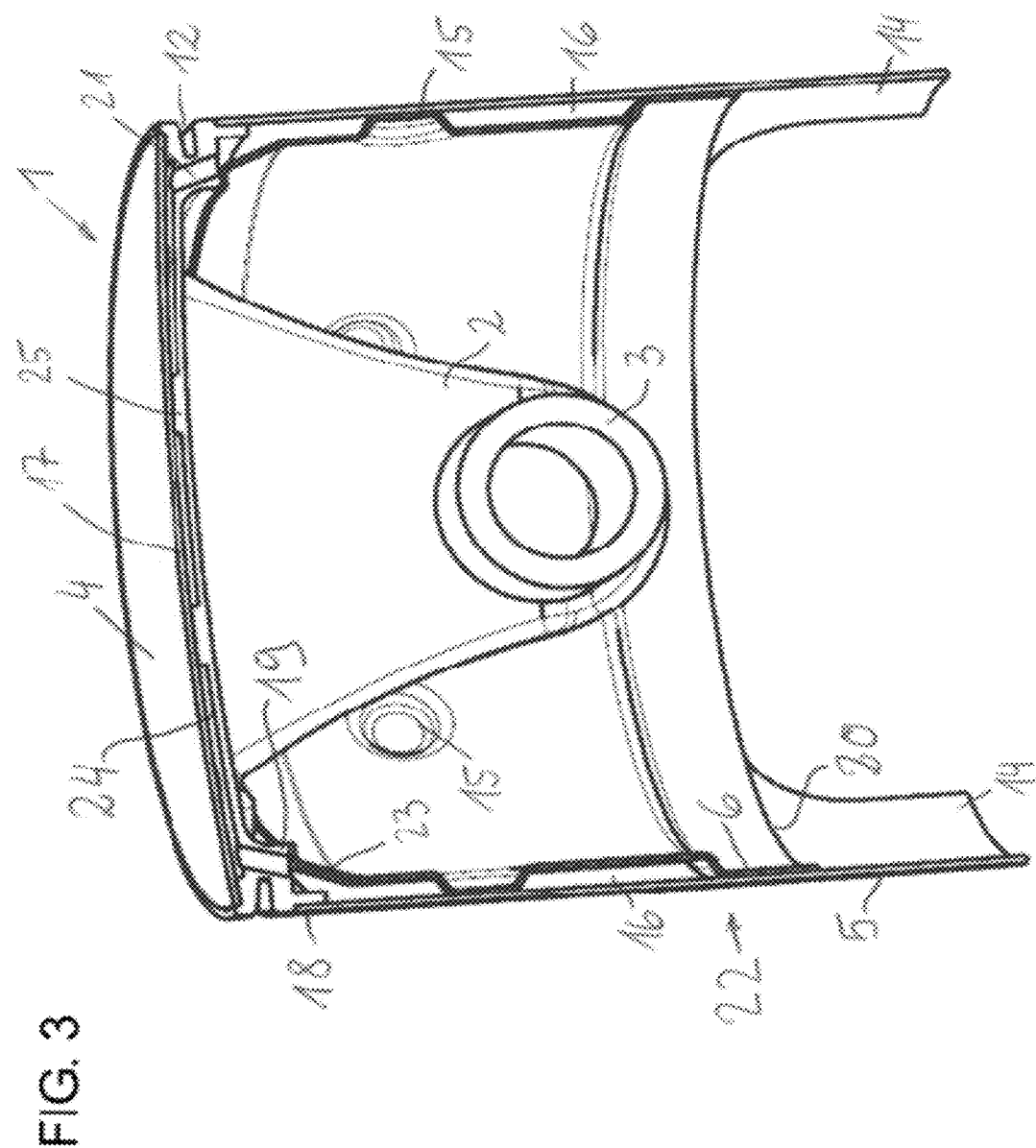
FIG. 3 and FIG. 4 show an oblique view of a piston in section.

FIG. 3 shows a perspective section through a piston according to the invention according to FIG. 1*a*. The external tubular piece 5 bears on an externally oriented projection 18 of the piston head 1. In this region, the external tubular piece 5 may be welded to the piston head 1. The internal tubular piece 6 may bear against an inwardly oriented projection 19 of the piston head 1 or also abut the inner surface of the piston head 1 and is welded at the point of abutment on the piston head 1.

The peripheral end edge 20 of the internal tubular piece 6 remote from the piston head is welded to the external tubular piece 5. Moreover, it is visible from FIG. 3 that outwardly protruding bulged portions, respectively dimples 15, are formed in the internal tubular piece 6, with which the two tubular pieces 5, 6 bear against one another. The shape of the bulged portions 15 and/or the number thereof may be selected to be of any number. Advantageously, said bulged portions 15 extend approximately over half the height of the hollow space 16 located between the tubular pieces 5 and 6. The bulged portions 15 are arranged on the periphery with the same spacings. The bulged portions 15 may be welded to the external tubular piece 5.

Inside the hollow chamber 17, spacers 25 protrude from the surface 24 of the piston head 1 for supporting the cover plate 4, wherein the cover plate 4 is optionally connected by welding to said spacers 25.

The channels 21 discharge into the hollow space 16 in the region of the piston head 1, said hollow space being located between the two concentrically arranged tubular pieces 5, 6. In terms of structure, it is advantageous if in the discharge region of the channels 21 the internal tubular piece 6 comprises a drawn-in and/or peripherally reduced end region or end cone 23.

Figure 4:
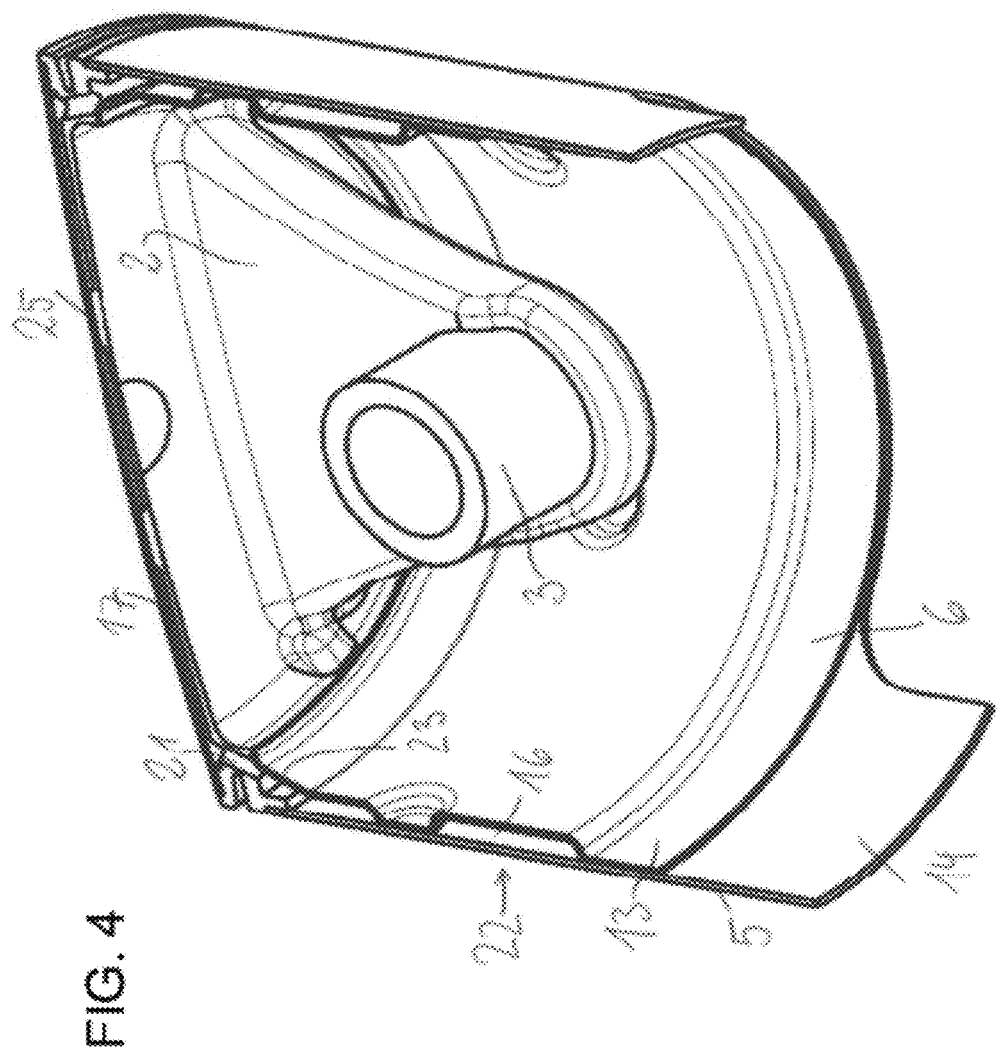

FIG. 4 shows a further perspective sectional view of a piston according to FIG. 1*a*, which in section is in the same plane as the piston according to FIG. 3. It may also be seen here that the two tubular pieces 5, 6, forming a hollow space 16 extending at least over partial regions of the height of the mantle wall 22 or the internal tubular piece 6, are arranged concentrically and that a cover plate 4 is positioned on the surface 24 of the piston head 1 in the vicinity of the combustion chamber, said cover plate being located at a distance from said surface 24 and forming a hollow chamber 17 with said surface 24.

Coolants are used which are liquid at the operating temperature of the piston and solid at room temperature. Approximately one third of the volume of the hollow chamber 17 and the hollow space 16 is filled with coolant. FIG. 4 also shows that the end region 13 of the internal tubular piece 6 remote from the piston head is widened and bears against the inner surface of the external tubular piece 5.

Figure 5:
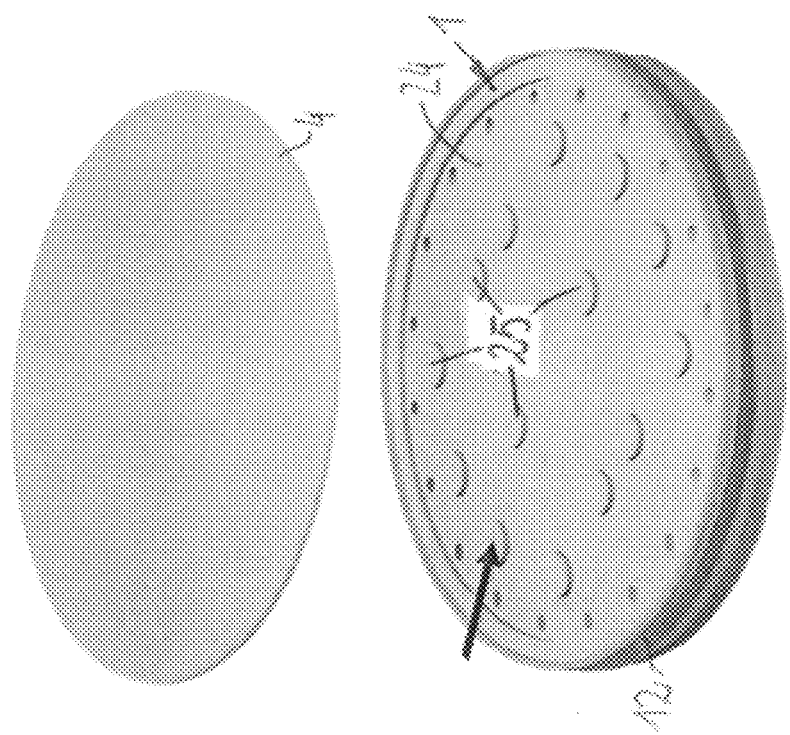
FIG. 5 shows a piston head and a cover plate which may be positioned thereon.

FIG. 5 shows in a detailed view a cover plate 4 which is positioned on the surface 24 of the piston head 1 on the combustion chamber side and is preferably welded there. The spacers 25 which protrude from the surface 24 of the piston head 1, support the cover plate 4 so that the hollow chamber 17 may be produced between the cover plate 4 and the surface 24 and kept upright, respectively outwardly bulged, during operation even at high pressure.

Figure 6:
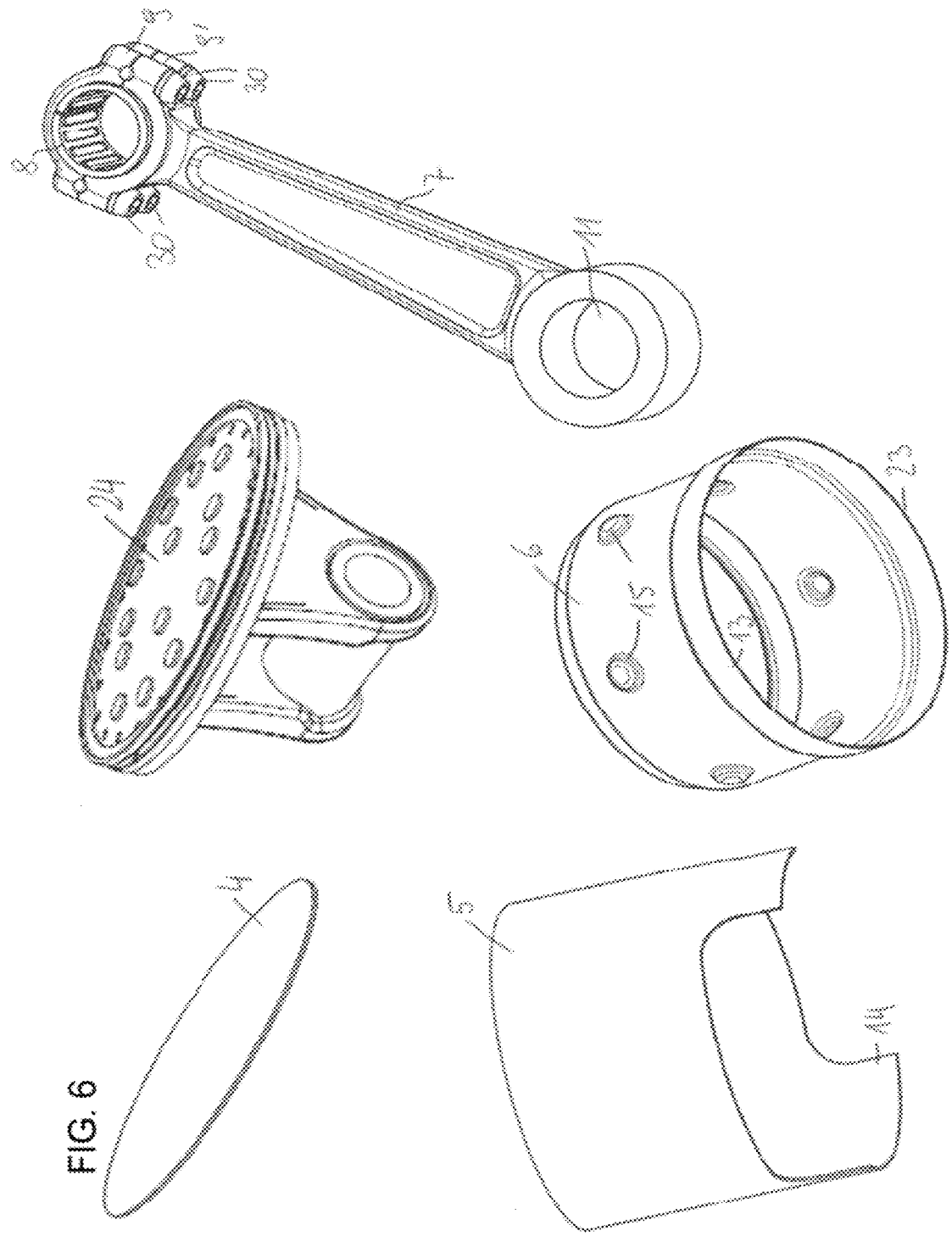
FIG. 6 shows a view of the primarily important components required for producing a piston according to the invention, namely a piston head with a piston pin support, a cover plate, a piston pin, a connecting rod with a bearing as well as two tubular pieces for forming the mantle wall.

In FIG. 6, the essential components are shown which are required for producing a piston according to the invention with a connecting rod.

Figure 7:
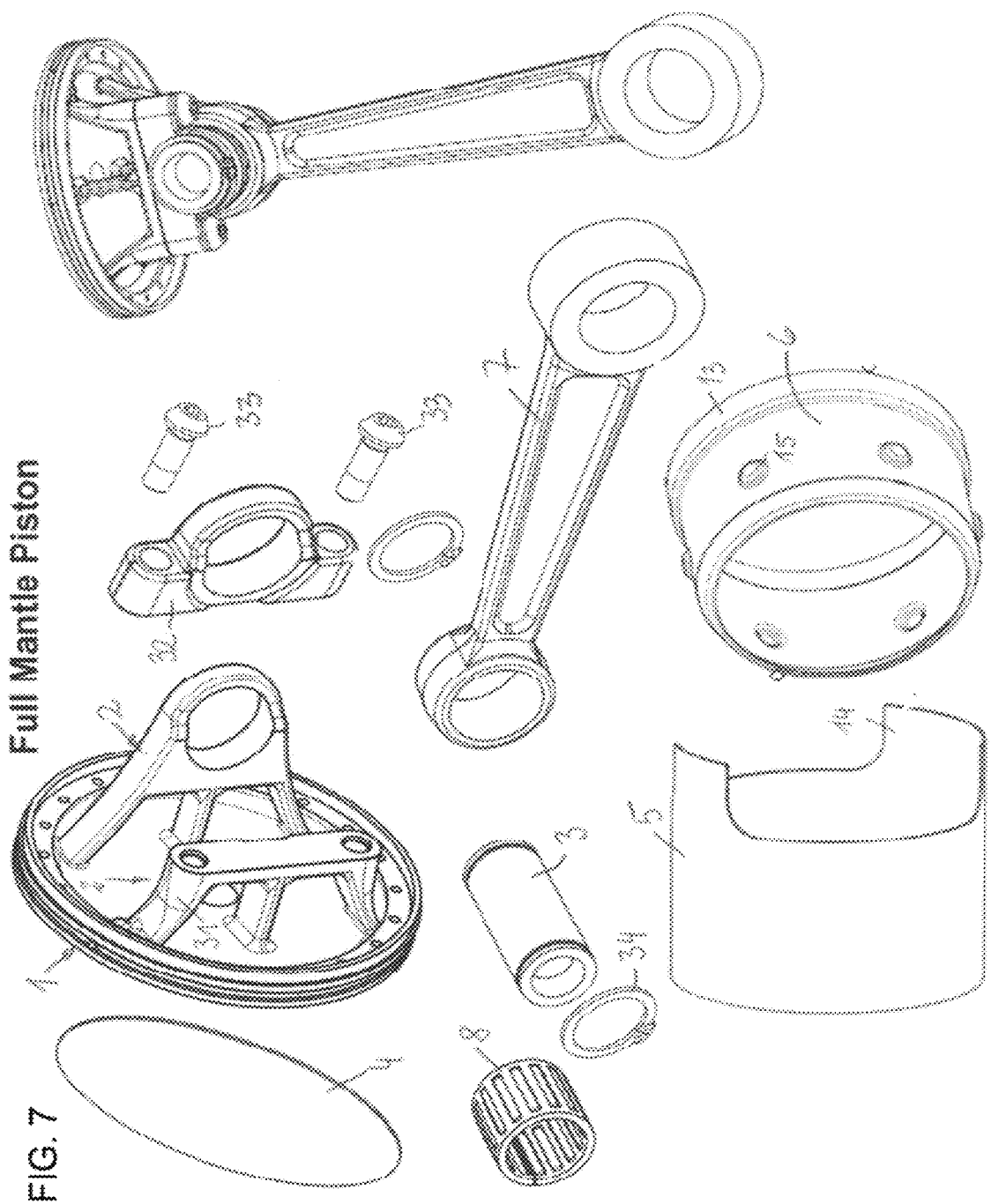
FIG. 7 shows an alternative embodiment of a piston and/or the individual parts thereof.

FIG. 7 shows the individual parts of an alternative embodiment of a piston according to the invention, in which the piston pin support 2 is altered. Of the two supports of the piston pin support, one support comprises a stand part 31 which is connected to, or integrally formed on, the piston head 1. A bearing part 32 is able to be connected to said stand part 31, for example able to be screwed on by screws 33, into which a piston pin 3 is rotatably inserted or fixed by welding. The piston pin 3 could also be secured by Seeger circlips rings or circlips 34. In this type of mounting of the piston pin 3, mounting recesses are not required in the mantle wall 22.

It is advantageous in terms of strength if the cover plate 4 and/or the tubular pieces 5, 6 are welded to the piston head 1. In principle, even with lower demands it is possible to connect said components via an interference fit and/or by means of flanging.

For the operation, it is advantageous if at least the external tubular piece 5, preferably the two tubular pieces 5, 6, form a continuous mantle wall 22 without recesses, which is also configured to be closed and continuous in the region of the piston pin 3. Insofar as the regions of the mantle wall 22 which are located in the vicinity of, or oppose, the end regions of the piston pin 3 comprise recesses for inserting the piston pin 3, said recesses may be closed by closure parts, which optionally continue the surface of the mantle wall 22 and/or follow the surface path of the mantle wall 22. Thus an undesirable overflow of charge into the crank case is avoided.

Particularly high strength values and stability can be achieved when the piston head 1 and the piston pin support 2 are produced from a cast material, preferably ductile cast iron, or produced by investment casting or by powder metal technology or forging. Optionally fiber-reinforced aluminum, magnesium or other light metal alloys are considered as material. The tubular pieces 5, 6 are formed from steel, and the cover plate 4 may be produced by a steel plate which is advantageously curved outwardly in a convex manner. The piston head 1 and the piston pin support 2 are configured according to FIGS. 3 and 4 as a one-piece cast part; the piston pin 3 is welded into the piston pin support 2.

FIG. 6 shows the bearing 8 with which the connecting rod 7 is pivotably mounted on the piston pin 3. It is advantageous in this case if both the bearing 8 enclosing the piston pin 3 and the eye of the connecting rod 7 are configured to be able to be separated and/or as parts 9, 9' able to be joined together by fit bolts or screws 30.

According to the invention, it is particularly advantageous if a full skirt piston is produced which has the best sliding properties without openings in the mantle wall 22. The regions of the mantle wall 22 which are located in the vicinity of the ends of the piston pin 3 may be closed or are covered by the external tubular piece 5 in a piston pin 3 which is not welded in the piston pin support 2. The mantle wall 22 is stable and rigid due to the two concentric tubes 5, 6 welded together. In particular, the greatest thermal stability is achieved by the use of ductile cast iron and steel material. A high degree of durability results from the bending stiffness of the mantle wall 22, due to the two concentric tubes connected together 5, 6. The possibility of the tubular pieces 5, 6, which are used, being of thin-walled configuration results in the piston being of low weight. The thickness of the tubes 5, 6 and the cover plate 4 is less than 1 mm. In tubes 5, 6 made of light metal, the thickness may increase to 2 mm without increasing the weight relative to steel tubes.

The invention also relates to an engine comprising at least one cylinder, in which a piston of the type according to the invention is arranged.

Advantageously sodium acetate trihydrate in the form of a fine powder granulate or thermal oil or sodium may be used as coolant. Approximately one third of the hollow chamber 17 and the hollow space 16 in the piston skirt and/or in the mantle wall 22 may be filled thereby. For filling the coolant, an inlet opening may be formed in the mantle wall 22 and/or in the piston head 1, which may be closed by a closure screw, for example a grub screw.

Figure 8:
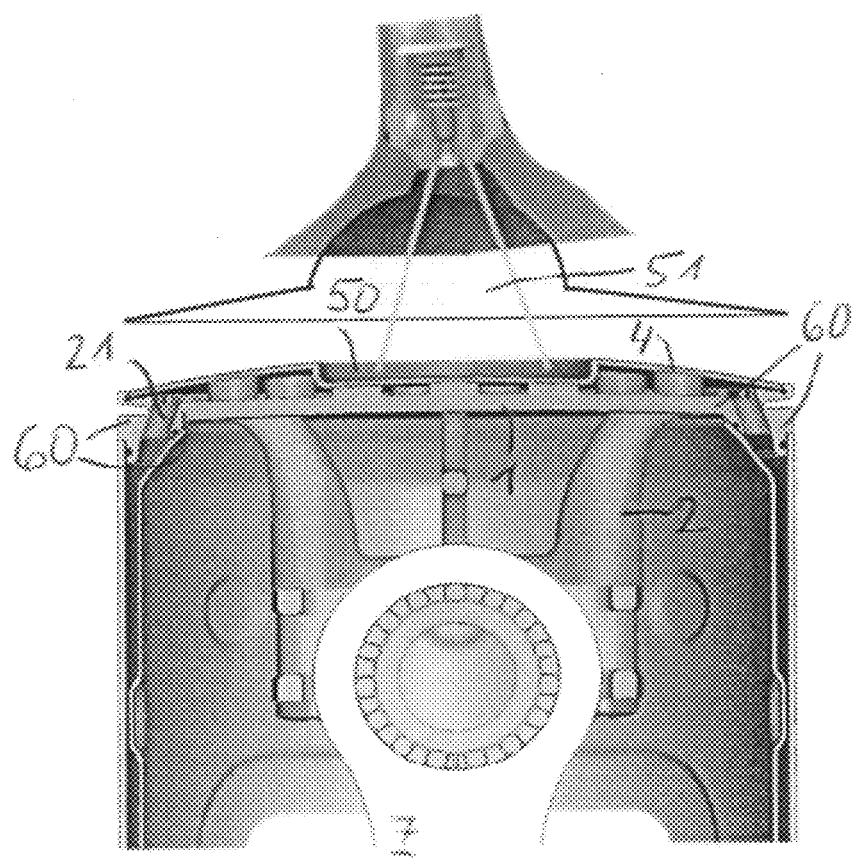
FIG. 8 shows an embodiment of a piston in section.

The spray cone of directly injected fuel is denoted in FIG. 8 by 51.

As FIG. 8 shows, a centrally located recess or antisplash bowl 50 may be formed in the cover plate 4. By means of the cylindrical peripheral shape, said recess 50 prevents injected fuel from being bounced off said region of the cover plate 4 onto the cylinder walls. The cover plate 4 in which said recess 50 is formed may be configured to be convex in its external peripheral regions. Also, the bottom surface of the recess 50 may have a convex portion.

It is noteworthy that, in the subject of the invention, by means of the concentric arrangement of tubular pieces 5, 6 with a predetermined spacing a fixed and yet resilient mantle wall 22 may be formed, in particular with regard to the fact that the mantle wall 22 has to absorb considerable heat expansion and bending moments. For this reason, it is expedient to weld the two tubular pieces 5, 6 forming the mantle wall 22 fixedly to the piston head 4. Thus a good connection between the elements consisting of different materials results, namely the piston head 4, on the one hand, and the two tubular pieces 5, 6, on the other hand. The two tubular pieces 5, 6 form a highly rigid mantle wall 22 which encloses the hollow space 16.

It is possible to configure the spacers 25 provided for supporting the cover plate in the form of complete cylinders or in the form of annular cylinders. In a configuration of annular or hollow cylinders, the heat transfer is reduced from the cover plate 4 to the piston head 1.

The term welding as used herein includes all processes of thermal connecting procedures, especially comprising, brazing, soldering, spot welding, arc welding and electron beam welding.

The invention claimed is:

1. A piston, comprising:
   a piston head;
   a piston pin support projecting from said piston head; and
   a mantle wall connected to said piston head, said mantle wall including two tubular pieces arranged concentrically relative to one another and connected to said piston head at a periphery of said piston head, and wherein said tubular pieces are an external tubular piece and an internal tubular piece disposed with a hollow space formed between said external and internal tubular pieces;
   an end region of said internal tubular piece remote from said piston head being widened and bearing against an inner surface of said external tubular piece and being connected to said external tubular piece by roll welding; and
   said internal tubular piece having a plurality of outwardly protruding bulged portions formed thereon and distributed about a circumference of said internal tubular piece, for connecting said internal and external tubular pieces to one another and spacing said internal and external tubular pieces from one another and forming a hollow space therebetween.

2. The piston according to claim 1, wherein said tubular pieces include an external tubular piece and an internal tubular piece, and wherein said external tubular piece bears against an outwardly oriented projection of said piston head and/or said internal tubular piece bears against an inwardly oriented projection of said piston head or protrudes on to said piston head.

3. The piston according to claim 2, wherein a peripheral end edge or end cone of said internal tubular piece remote from said piston head is welded to said external tubular piece.

4. The piston according to claim 1, which comprises an amount of coolant disposed in said hollow space.

5. The piston according to claim 1, which comprises a cover plate on a combustion chamber side disposed above a surface of said piston head in a vicinity of the combustion chamber, said cover plate being spaced apart from said surface of said piston head and forming a hollow chamber with said surface.

6. The piston according to claim 5, wherein said hollow space and said hollow chamber are connected via channels extending through said periphery of said piston head and wherein a coolant is contained in at least one of said hollow space and said hollow chamber, said coolant being liquid at an operating temperature of the piston and being solid at room temperature.

7. The piston according to claim 6, wherein said channels discharge in a collar at a region of said piston head, which is located between said two concentrically arranged tubular pieces.

8. The piston according to claim 6, wherein said tubular pieces include an external tubular piece and an internal tubular piece, and wherein said internal tubular piece comprises an inwardly inclined and/or peripherally reduced end region in a discharge region of said channels.

9. The piston according to claim 6, which comprises spacers disposed inside said hollow chamber for supporting said cover plate, said spacers projecting from the surface of said piston head, and wherein said cover plate is optionally connected to said spacers by spot welding.

10. The piston according to claim 6, wherein one or both of said cover plate and said tubular pieces are welded to said piston head and/or connected thereto by forming an interference fit and/or by a flanging connection.

11. The piston according to claim 6, wherein said hollow space and/or said hollow chamber are filled up to 25 to 50% of a volume thereof with coolant.

12. The piston according to claim 6, wherein said hollow space and/or said hollow chamber are filled up to 30 to 40% of the volume thereof with coolant.

13. The piston according to claim 1, wherein said two tubular pieces are arranged concentrically, forming a hollow space extending at least over partial regions of the height of the mantle wall or the internal tubular piece.

14. The piston according to claim 1, wherein said tubular pieces include an external tubular piece and an internal tubular piece, and wherein at least said external tubular piece forms a continuous mantle wall without recesses, which is configured to be closed and continuous even in a region of said piston head.

15. The piston according to claim 14, wherein regions of said mantle wall located in a vicinity of or oppose end regions of said piston pin, are formed with recesses, which recesses are closed by closure parts that optionally extend an outer surface of said mantle wall and/or follow a surface path of said external tubular piece.

16. The piston according to claim 1, wherein said piston head and said piston pin support are produced or forged from a cast material, and/or said tubular pieces are formed from steel or aluminum or light metal alloy and/or a cover plate on said piston head is produced from a steel plate.

17. The piston according to claim 16, wherein said cast material is ductile cast iron or cast aluminum.

18. The piston according to claim 1, wherein said piston head and said piston pin support are formed as a one-piece cast part.

19. The piston according to claim 1, which comprises a piston pin welded into said piston pin support.

20. The piston according to claim 1, which comprises a connecting rod pivotally mounted by a bearing on a piston pin.

21. The piston according to claim 20, wherein said bearing enclosing the piston pin and a boss of the piston pin are configured for separation and/or with parts which may be joined together, or that at least one support of the piston pin is configured so as to be able to be separated, and has a stand part connected to said piston head and a bearing part able to be connected thereto for the piston pin.

22. The piston according to claim 1, wherein a mantle wall surface of the piston formed by one of said tubular pieces forms two extensions or projections extending over a predetermined peripheral region and opposing one another.

23. The piston according to claim 22, wherein said tubular pieces include an external tubular piece and an internal tubular piece, and wherein said internal tubular piece reaches as far as an end region of the mantle wall located between the extensions and/or of said external tubular piece.

24. The piston according to claim 1, wherein said piston head is formed with at least one groove along a periphery thereof for receiving a piston ring.

25. The piston according to claim 1, wherein said piston head is formed with a depression.

26. The piston according to claim 25, wherein said depression is a cylindrical shaped recess formed centrally in said piston head. coolant.

27. An engine, comprising at least one cylinder and a piston according to claim 1.

* * * * *